(12) United States Patent
Arbesman et al.

(10) Patent No.: US 7,646,174 B2
(45) Date of Patent: Jan. 12, 2010

(54) BATTERY LOW-VOLTAGE CUTOFF CIRCUIT (75) Inventors: Aaron W. Arbesman, Wethersfield, CT (US); Jordan T. Bourilkov, Stamford, CT (US); David N. Klein, Southbury, CT (US); John Rotondo, Trumbull, CT (US)

(73) Assignee: The Gillette Company, Boston, MA (US)

( * ) Notice: Subject to any disclaimer, the term of this patent is extended or adjusted under 35 U.S.C. 154(b) by 359 days.

(21) Appl. No.: 11/359,270

(22) Filed: Feb. 22, 2006

(65) Prior Publication Data

US 2007/0195564 A1  Aug. 23, 2007

(51) Int. Cl.
*H02J 7/00* (2006.01)
(52) U.S. Cl. .................................................... 320/134
(58) Field of Classification Search ................ 320/134, 320/136
See application file for complete search history.

(56) References Cited

U.S. PATENT DOCUMENTS

| 4,342,953 | A | * | 8/1982 | Collins ....................... 320/136 |
| 4,703,247 | A | * | 10/1987 | Morioka ....................... 320/136 |
| 4,704,542 | A | * | 11/1987 | Hwang ......................... 307/66 |
| 4,935,316 | A | | 6/1990 | Redey |
| 5,073,837 | A | * | 12/1991 | Baek ........................... 361/92 |
| 5,569,550 | A | * | 10/1996 | Garrett et al. .................. 429/7 |
| 5,683,827 | A | | 11/1997 | Yu |
| 5,757,600 | A | * | 5/1998 | Kiraly ......................... 361/84 |
| 2005/0212483 | A1 | | 9/2005 | Li |

FOREIGN PATENT DOCUMENTS

JP  6-303727  10/1994

* cited by examiner

*Primary Examiner*—Edward Tso
*Assistant Examiner*—Ramy Ramadan
(74) *Attorney, Agent, or Firm*—Fish & Richardson P.C.

(57) ABSTRACT

A electronic device includes an electrical component powered by a battery and a compartment to receive the battery. A low voltage cutoff circuit is configured to couple to the battery. The low voltage cutoff circuit includes a switching device having a control terminal, a current sourcing terminal and current sinking terminal and a resistor coupled between the control terminal and a first terminal of a battery. The circuit has first and second output terminals. The first output terminal is coupled to the first terminal of the battery and the second output terminal is coupled to the current sourcing terminal of the transistor. The first and second output terminals are configured to accept connections to positive and negative terminals of the electrical component.

19 Claims, 5 Drawing Sheets

BATTERY LOW-VOLTAGE CUTOFF CIRCUIT

BACKGROUND

This invention relates to powering of portable electronic devices.

Portable electronic devices generally use a primary battery or a rechargeable battery to provide power. Many devices powered by a primary battery lack a mechanical power switch to turn the device off relying instead on a soft switch, e.g., an electronic switch to turn the device off. Other devices include a mechanical power switch. Those devices that include such a mechanical switch, a user may inadvertently leave the mechanical switch in the "ON" position. Under such circumstances, the device will continue to drain current from the battery and can deeply discharge the battery causing cell venting and electrolyte leakage. Cell venting and electrolyte leakage from the battery can damage the device that houses the battery and are particular problems with alkaline and zinc-carbon cells. In addition, some re-chargeable cells can suffer cell venting and/or electrolyte leakage.

To prevent deep discharge, devices that lack a mechanical switch will use an embedded microcontroller or voltage comparators to operate an electronic switch to switch the device off. While suitable for more expensive devices, these techniques are complex and costly and generally not suitable for inexpensive devices, especially devices that do not already have a need for an embedded microcontroller or voltage comparators for the main function of the device.

SUMMARY

According to an aspect of the invention, a low voltage cutoff circuit includes a switching device having a control terminal, a current sourcing terminal and current sinking terminal and a resistor coupled between the control terminal and a first terminal of a battery. The low voltage cutoff circuit having a first output terminal coupled to the first terminal of the battery and a second output terminal coupled to the current sourcing terminal of the switching device, with the first and second output terminals of the low voltage cutoff circuit configured to accept connections to the positive and negative terminals of a device load.

The following embodiments are within the scope of the invention. The low voltage cutoff circuit includes a mechanical switch coupled in series with either the current sinking or the current sourcing terminals the device. The resistor has a resistance value provided in accordance with a maximum current provided to the device. The resistance value is approximately 300 ohms. The resistance value is approximated by $(V_{battery\ min} - V_{be})/I_b$, where $V_{be}$ is the base to emitter junction voltage drop and $I_b$ is the base current needed to saturate the collector-emitter junction.

According to an additional aspect of the invention, a power source includes a battery and a low voltage cutoff circuit. The low voltage cutoff circuit includes a switching device having a control terminal, a current sourcing terminal and current sinking terminal and a resistor coupled between the control terminal and a first terminal of a battery. The circuit includes first and second output terminals, the first output terminal coupled to the first terminal of the battery and the second output terminal coupled to the current sourcing terminal of the switching device, with the first and second output terminals configured to accept connections to positive and negative terminals of a device load.

The following embodiments are within the scope of the invention. The power source further includes a mechanical switch coupled in series with either the current sourcing or the current sinking terminals the switching device. The switching device is a bipolar transistor, and the control electrode is the base, the current sourcing electrode is the collector and current sinking terminal is the emitter. The power source includes at least one junction device coupled in series with the control electrode of the switching device and the resistor. The junction device is a diode coupled in series to increase the effective voltage required on the control electrode to allow current flow between the current sinking and sourcing electrodes. The junction device is a second switching device coupled with the switching device in a Darlington configuration.

According to an additional aspect of the invention, an electronic device includes an electrical component powered by a battery and a low voltage cutoff circuit. The low voltage cutoff circuit is configured to be coupled to the battery, and includes a switching device having a control terminal, a current sourcing terminal and current sinking terminal, and a resistor coupled between the control terminal and a first terminal of a battery. The low voltage cutoff circuit includes first and second output terminals, the first output terminal coupled to the first terminal of the battery and the second output terminal coupled to the current sourcing terminal of the switching device, with the first and second output terminals configured to accept connections to positive and negative terminals of the electrical component.

The following embodiments are within the scope of the invention.

The electronic device includes a housing including a compartment to receive a battery. The electronic device includes a battery disposed in the compartment. The battery is an alkaline cell, Zn—Carbon cell or a rechargeable cell. The electronic device includes a mechanical switch coupled in series with the current sourcing or the current sinking terminals the device. The switching device is a bipolar transistor, the control electrode being the base, the current sourcing electrode being the collector and current sinking terminal being the emitter. The electronic device includes at least one junction device coupled in series with the control electrode of the switching device and the resistor. The junction device is a diode coupled in series to increase the effective voltage required on the control electrode to allow current flow between the current sinking and sourcing electrodes. The junction device is a second switching device coupled with the switching device in a Darlington configuration. The electronic device includes a mechanical switch coupled in series with the current sourcing terminal of the device and before the control terminal of the device to prevent current flow from the battery to the control terminal and the current sourcing terminals of the device.

One or more aspects of the invention may provide one or more of the following advantages.

If the user forgets to switch the mechanical switch into the "OFF" state, a battery coupled to the circuit will continue to discharge through the device. However, as the battery voltage drops, the battery voltage eventually will become lower that the voltage needed to bias switching device into the "ON" state. At that point, the switching device will turn off. This will prevent a large drain on the battery and allow the battery to remain at a partially discharged state for an indefinite period of time, giving the user time to either turn the device 16 off and replace the battery, before cell venting or electrolyte leakage occurs. The low voltage cutoff circuit retards the battery from deeply discharging caused by continued operation of the device, thus mitigating against the aforementioned cell venting and electrolyte leakage.

DETAILED DESCRIPTION

Figure 1:
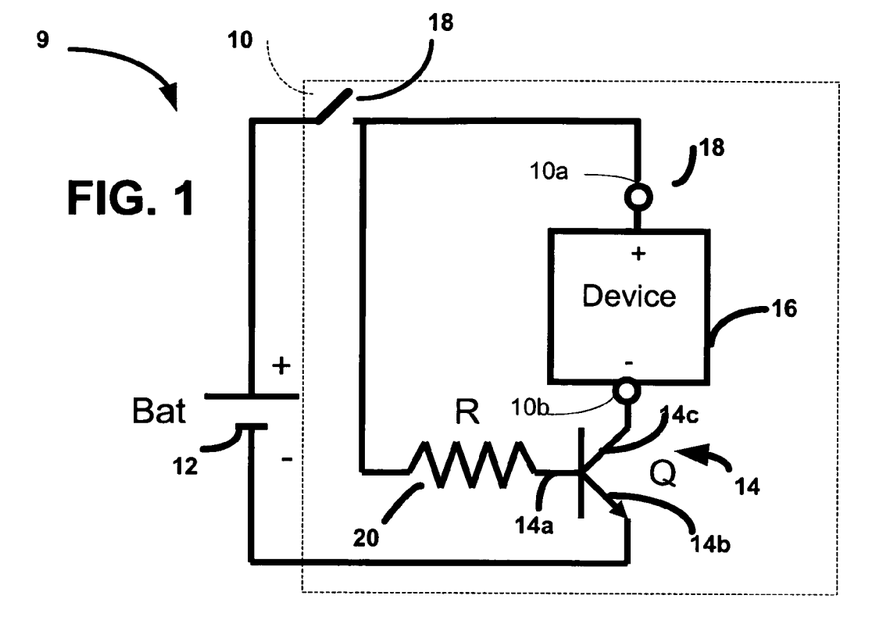
FIGS. 1-4 are schematic diagrams of low voltage cut-off circuits.

Referring to FIG. 1, a power source 9 includes a low voltage cutoff circuit 10 and a battery 12. The low voltage cutoff circuit 10 includes a three terminal switching device, e.g., a transistor 14 and a resistor 20. The battery 12 is a primary cell or a rechargeable cell and preferable needs to be protected against deep discharge, e.g., the cell voltage falling below a certain percentage of the nominal fully charged cell voltage level. The transistor 14, is here a bipolar transistor (n-p-n type) having a control electrode, e.g., a base electrode 14a, a current sinking electrode, e.g., an emitter 14b and a current sourcing electrode, e.g., a collector 14c. The base 14a of the transistor 14 is coupled to the positive terminal of the battery 12, via the resistor 20, and the negative terminal of the battery 12 is coupled to the emitter 14b.

The circuit 10 includes a device 16, which could be any of a large variety of electrical components, electrically coupled in series between the collector 14c of the transistor and the positive terminal of the battery, e.g., via output terminals 10a and 10b of the circuit. In general, electrical terminals or contacts 10a, 10b connect the device 16 into the power source 9 between the positive rail of the battery and the collector 14c of the transistor 14. The circuit 10 also includes a mechanical switch 18 connected between the positive terminal of the battery and the positive terminal 10a that provides the positive supply for the device 16. This arrangement has the switch 18 disposed to cut off power to the base and emitter circuits of the circuit 10, when the switch is open.

Figure 1A:
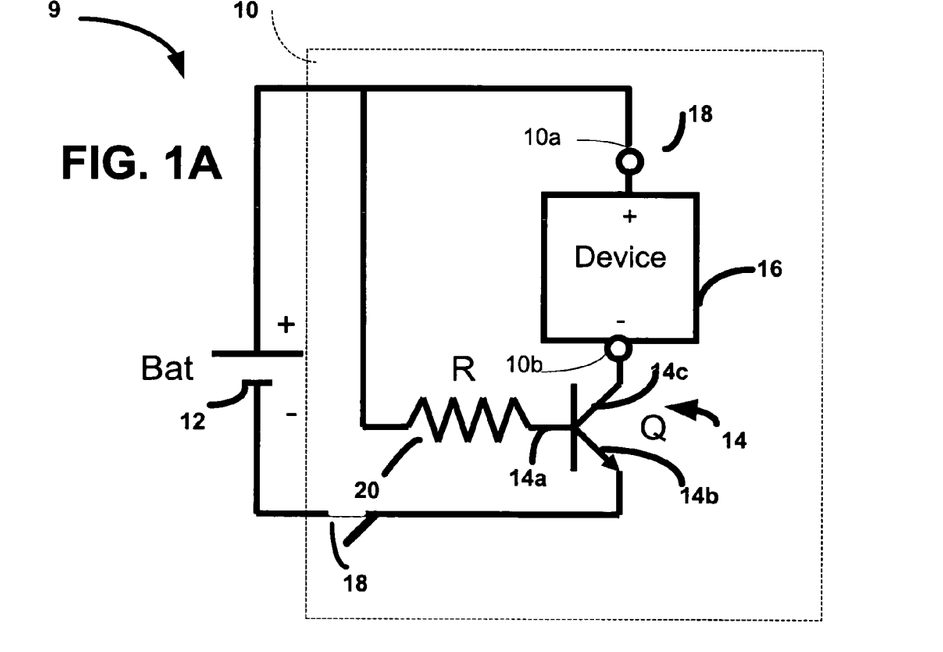
FIG. 1A is a schematic diagram of low voltage cut-off circuit showing an alternative location for a switch in the embodiment of FIG. 1.

Alternatively, as shown in FIG. 1A, the switch 18 can be disposed between the negative terminal of the battery and the emitter.

The transistor 14 provides a electrically controlled switch to control current drain from the battery to the electrical device 16. The configuration in FIG. 1 is a negative rail switching configuration in which the emitter of the n-p-n transistor 14 is connected to the battery negative terminal (−) and the collector is connected to the device 16 negative terminal (−).

The resistor 20 connected from the device positive terminal to the base of the transistor 14 has a resistance value selected to provide a base current that is sufficient high to saturate the transistor at the lowest desired operating voltage and highest device load. For example, if the device drains a maximum current of 100 mA and the transistor has a forward current transfer ratio beta (B) of 100, a minimum of 1 mA is needed to flow through the base-emitter junction. If the minimum operating voltage of the device is, e.g., 0.9V, the maximum resistor value for resistor 20 is:

$$(V_{battery\ min} - V_{be})/I_b = (0.9V - 0.6V)/1\ mA = 300\ Ohms.$$

where $V_{be}$ is the base to emitter junction voltage drop and $I_b$ is the base current needed to saturate the collector-emitter junction.

The exact or optimum resistance value thus depends on specific characteristics of the transistor, e.g., the value of $V_{be}$, $I_b$ and B and the needs of the load.

The arrangement in FIG. 1 has the device 16 coupled in series between the collector 14c and the emitter 14b of the transistor 14. When a user switches the switch 18 to the "ON" state, as long as the voltage of the battery 12 is sufficiently high to maintain a forward bias on the base-emitter junction, the collector-emitter will be conducting and the device 16 will receive power from the battery with return being through the emitter.

If the user forgets to switch the switch 18 into the "OFF" state, the battery 12 will continue to discharge through the device 16. However, as the battery discharges and the battery voltage drops, the battery voltage eventually will become lower that the voltage needed to bias the base-emitter junction of transistor 14 in the "ON" state, e.g., about 0.6 to 0.7 volts. At that point, the base-emitter junction will no longer be forward biased and emitter-collector junction will be non-conduction, turning the transistor 14 off and effectively turning the device 16 off. This will prevent a large drain on the battery and allow the battery 12 to remain at this partially discharged state for an indefinite period of time, giving the user time to turn the device 16 off and replace the battery, before cell venting or electrolyte leakage occurs.

The low voltage cutoff circuit 10 retards the battery 12 from deeply discharging caused by continued operation of the device 16, thus mitigating against the aforementioned cell venting and electrolyte leakage. Now, with devices including a mechanical power switch the circuit 10 mitigates cell venting and electrolyte leakage even if the user inadvertently leaves the switch in the "ON" position, since the device 16 will not drain the battery once the battery discharges to around 0.6 to 0.7 volts. For alkaline cells this value is only slightly below a generally recommended minimum voltage of 0.8 volts. Quiescent currents at this voltage level are generally very low, allowing the battery to remain at that voltage level for an extended time and avoid deeply discharging the battery and causing electrolyte leaking or pressure venting.

Figure 2:
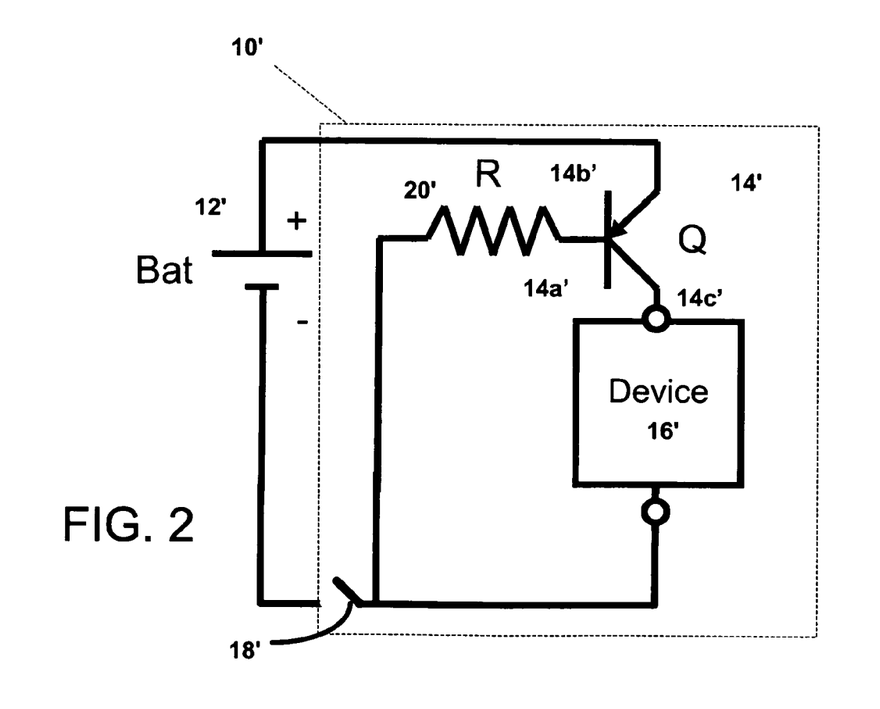

Referring to FIG. 2, a positive power supply rail switch configuration using a similar circuit 10' to that shown in FIG. 1, includes a p-n-p transistor 14'. The low voltage cutoff circuit 10' includes a battery 12, a p-n-p transistor 14' and a resistor 20. The p-n-p transistor is used with the emitter 14b' connected to the battery positive terminal and the collector 14c' connected to the device positive terminal. The resistor 20' is connected between the battery negative terminal and the base 14a' of the transistor 14'.

The circuit 10 has a mechanical switch 18' and a device load 16', which could be any of a large variety of electrical components, electrically coupled in series between the collector 14c' of the transistor 14' and the positive terminal of the battery 12'. The resistor 20' has a resistance value selected to provide a base current that is sufficient high to saturate the transistor 14' at the lowest desired operating voltage and highest device load, as discussed for FIG. 1.

Figure 3:
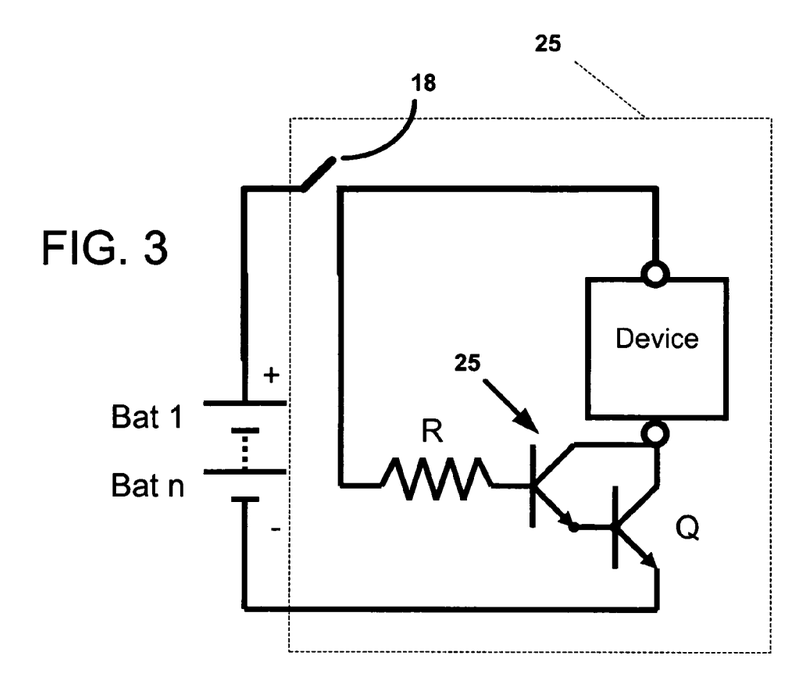

Referring to FIG. 3, a low voltage cutoff circuit 25 useful for, e.g., 3V battery powered devices (e.g., two 1.5 volt cells in series) includes a "Darlington" configuration 26 of two bipolar transistors to provide suitable a cutoff voltage value in the range of about 1.2V to 1.6V. In the Darlington configuration 26, the arrangement of the two transistors requires two base-emitter junctions to be forward biased thus, increasing the voltage required at the battery 12 to prevent the circuit 25 from cutting off the device. The Darlington configuration uses two transistors of the same type, here n-p-n being shown. Other than requiring a higher voltage to cause the transistors to shut off (and thus allowing for connection of two battery cells in series), operation is similar to that shown in FIG. 1. An analogous arrangement can be provided using p-n-p transistors.

Figure 4:
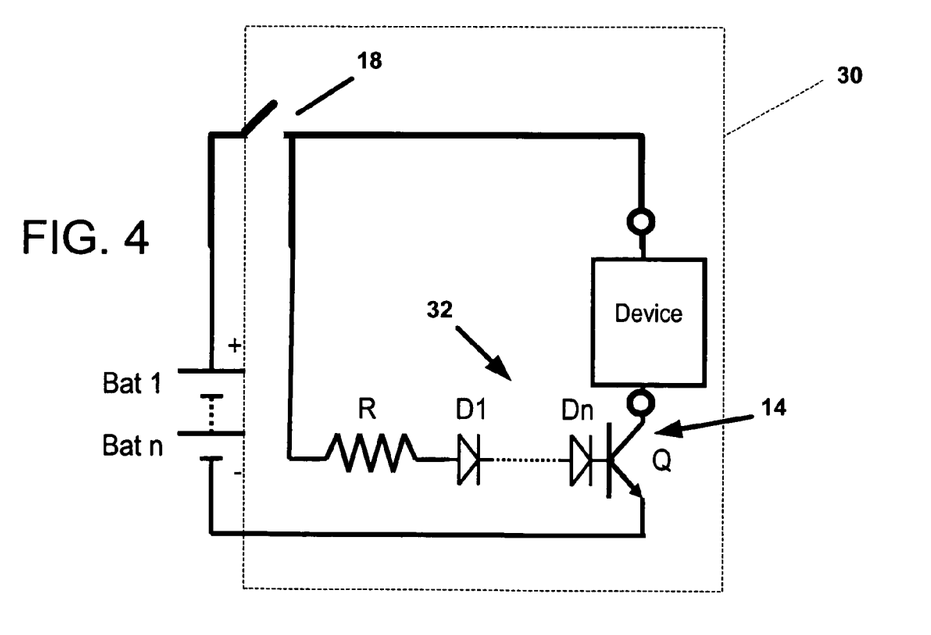

Referring to FIG. 4, a low voltage cutoff circuit 30 including one or more diodes 32, e.g., Silicon diodes added in series with the base of the transistor 14 (FIG. 1). The diodes 32 are used to increase the voltage required by the battery to forward bias the base-emitter junction of the transistor 14 and is used with batteries having higher cell voltages or batteries comprising several cells, e.g., alkaline cells connected in series, to account for the voltage provided by the higher cell voltage or the added cells. For alkaline cells in series, one diode is added for each additional cell.

Figure 5:
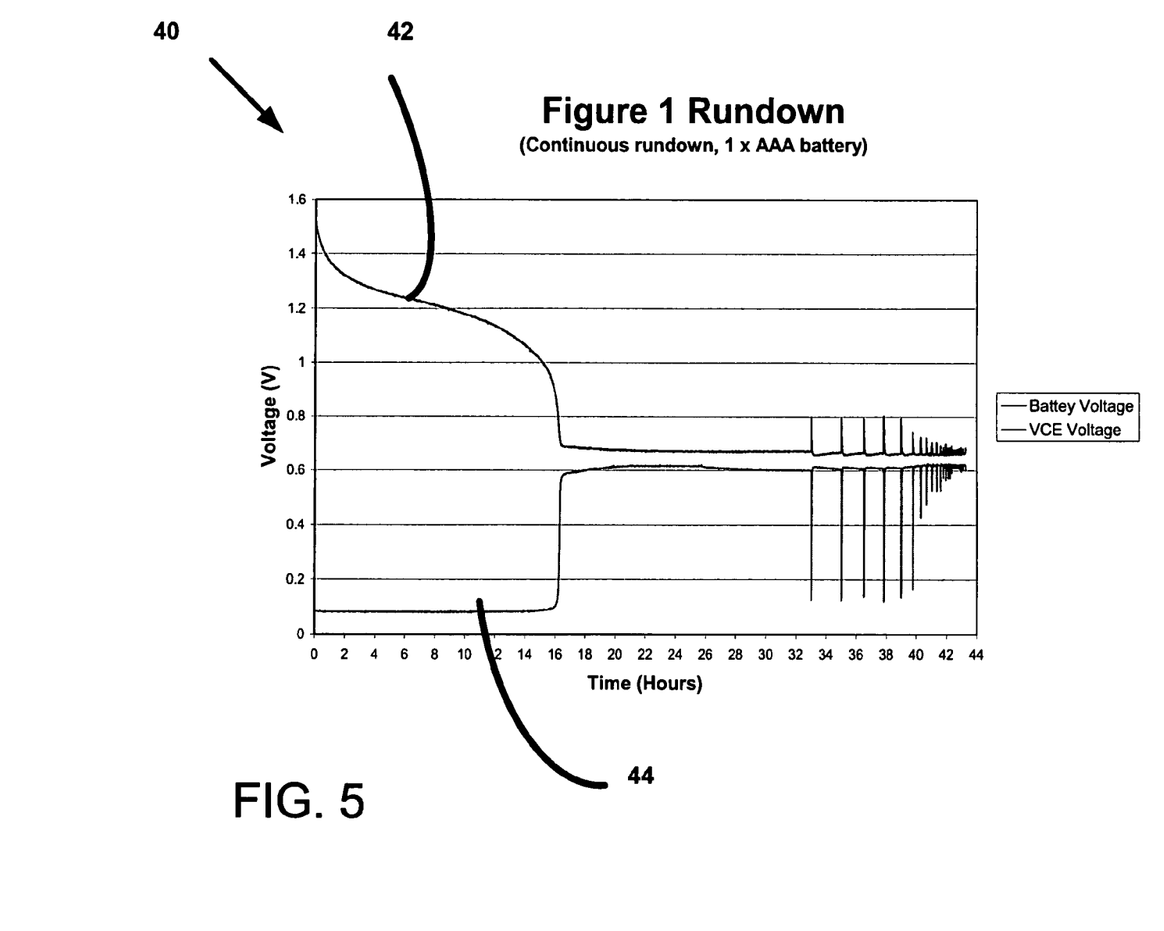
FIG. 5 is a graph depicting cell voltage as a function of time.

Referring to FIG. 5, a plot 40 of cell voltage over time is shown for a single cell, a "AAA" alkaline Ultra® from Duracell and for the voltage across the collector-emitter junction of a transistor under a load by a power razor device using the circuit of FIG. 1. Functional cutoff occurs at battery voltage of around 0.7V and the voltage of the battery was maintained at that level by the circuit, with intermittent short pulses.

The cutoff circuit can be implemented using discrete components that can be designed into electrical devices or added to devices during manufacture. The components are relatively inexpensive making this an excellent solution, especially for low-cost consumer products such as electric shavers, flashlights, radios, and so forth. In addition to the use of bi-polar transistors, field effect transistors, e.g., MOSFETS having low gate bias voltages could also be used. However, in general bipolar transistors are less expensive, so may be preferred where cost is a significant consideration.

Figure 6:
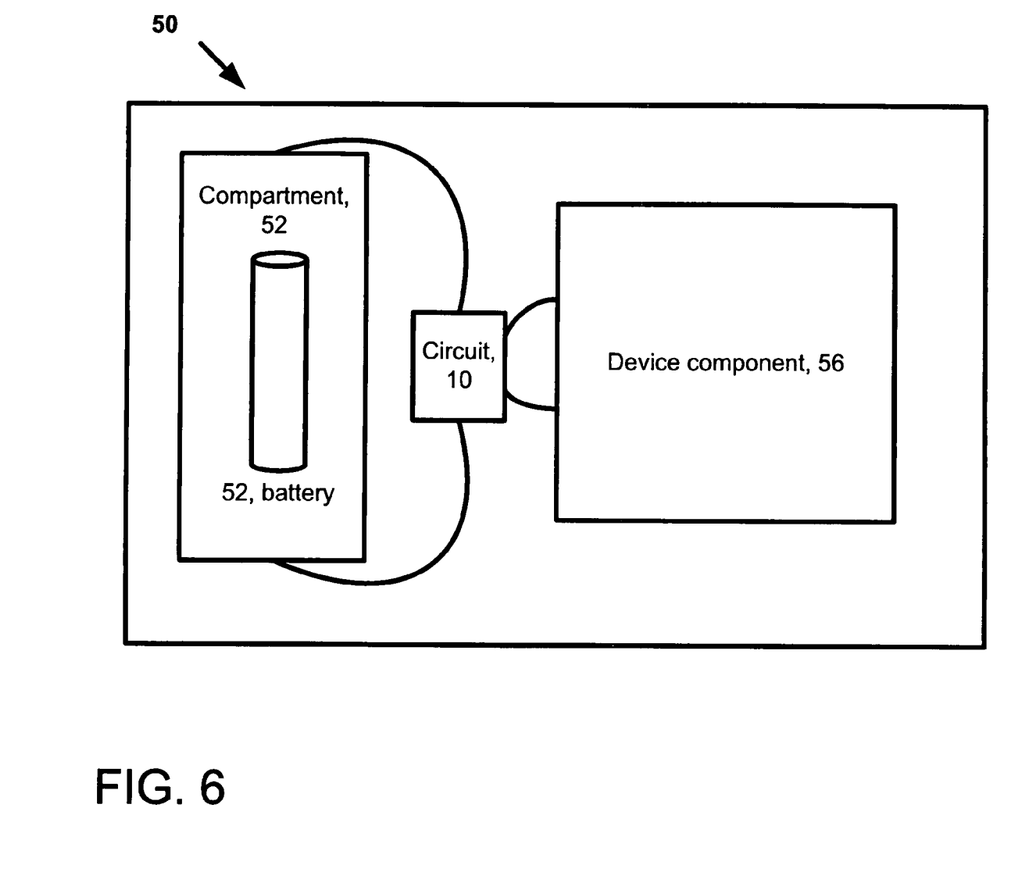
FIG. 6 is a block diagram of a battery-powered device.

Referring to FIG. 6, a generic device 50, which may be a battery-powered razor, flashlight, radio and so forth, is shown. The powered electronic device 50 include a compartment 52 to receive a battery 54, which may be a primary cell or a rechargeable cell, and an electrical component 56 in the device 50 that uses power from the battery. The electrical component 56 can be a motor, light bulb, radio receiver, or any other type of electrical component. The low voltage cutoff circuit, e.g., circuit 10 or any of the others described above is provided to couple the battery to the component via lines (not numbered) generally as discussed above.

A number of embodiments of the invention have been described; other embodiments are within the scope of the following claims. For example, by varying the value of the resistance of the resistor disposed in the base circuit, e.g., resistor 20, the slope of cutoff characteristic can be varied. For example, by increasing the resistance, the cutoff characteristic is softer, e.g., more gradual, whereas reducing the resistance causes the cutoff characteristic to be steeper, e.g., more abrupt.

What is claimed is:

1. A low voltage cutoff circuit comprises:
    a switching device having a control terminal, a current sourcing terminal and a current sinking terminal;
    a resistor coupled between the control terminal and a first terminal of a battery;
    a mechanical switch coupled in series with the battery and a first output terminal of the low voltage cutoff circuit and connected, without any intervening switching device and without any intervening battery, to the resistor that is coupled to the control terminal of the switching device with the low voltage cutoff circuit having in addition to the first output terminal, a second output terminal connected to the current sourcing terminal of the switching device, with the first and second output terminals of the low voltage cutoff circuit configured to accept connections to terminals of a device load.

2. The low voltage cutoff circuit of claim 1 wherein the resistor has a resistance value provided in accordance with a maximum drain current of the switching device.

3. The low voltage cutoff circuit of claim 1 wherein the resistance value of the resistor is approximately 300 ohms.

4. The low voltage cutoff circuit of claim 1 wherein the switching device is a bi-polar transistor and where the resistance value of the resistor is approximated by (Vbattery min−Vbe)/Ib, where Vbe is the base to emitter junction voltage drop and Ib is the base current needed to saturate the collector-emitter junction.

5. A power source comprises:
    a battery; and
    a low voltage cutoff circuit, the low voltage cutoff circuit comprising:
    a switching device having a control terminal, a current sourcing terminal and a current sinking terminal;
    a resistor coupled between the control terminal and a first terminal of the battery;
    a mechanical switch coupled in series with the battery and a first output terminal of the low voltage cutoff circuit and connected, without any intervening switching device and without any intervening battery, to the resistor that is coupled to the control terminal of the switching device; and
    a second output terminal coupled to the current sourcing terminal of the switching device, with the first and second output terminals configured to accept connections to terminals of a device load.

6. The power source of claim 5 wherein the switching device is a bipolar transistor, and wherein the control terminal is a base electrode of the bipolar transistor, the current sourcing electrode is a collector electrode of the bipolar transistor and current sinking terminal is a emitter electrode of the bipolar transistor.

7. The power source of claim 5, further comprising:
    at least one junction device coupled in series with the control terminal of the switching device and the resistor.

8. The power source of claim 5 wherein the junction device is a diode coupled in series to increase the effective voltage required on the control terminal to allow current flow between the current sinking and sourcing terminals.

9. The power source of claim 5 wherein the junction device is a second switching device coupled with the switching device in a Darlington configuration.

10. An electronic device comprises:
    an electrical component powered by a battery;
    a low voltage cutoff circuit, configured to couple to a battery, the low voltage cutoff circuit comprising:
    a switching device having a control terminal, a current sourcing terminal and a current sinking terminal;
    a resistor coupled between the control terminal and a first terminal of the battery;
    a mechanical switch coupled in series with the battery and a first output terminal of the low voltage cutoff circuit and connected, without any intervening switching device and without any intervening battery, to the resistor that is coupled to the control terminal of the switching device; and
    a second output terminal coupled to the current sourcing terminal of the switching device, with the first and second output terminals configured to accept connections to terminals of the electrical component.

11. The electronic device of claim 10, further comprising: a housing including a compartment to receive the battery.

12. The electronic device of claim 11 further comprising the battery in the compartment and wherein the battery is an alkaline cell, Zn-Carbon cell or a rechargeable cell.

13. The electronic device of claim 10 wherein the switching device is a bipolar transistor, the control electrode being a base electrode of the bipolar transistor, the current sourcing electrode being a collector electrode of the bipolar transistor and current sinking terminal being a emitter electrode of the bipolar transistor.

14. The electronic device of claim 10, further comprising:
at least one junction device coupled in series with the control terminal of the switching device and the resistor.

15. The electronic device of claim 10 wherein the junction device is a diode coupled in series to increase the effective voltage required on the control terminal to allow current flow between the current sinking and sourcing terminals.

16. The electronic device of claim 10 wherein the junction device is a second switching device coupled with the switching device in a Darlington configuration.

17. The electronic device of claim 12 wherein the mechanical switch coupled in series when open, is disposed to prevent current flow from the battery to the control terminal and the current sourcing terminal of the switching device.

18. The electronic device of claim 14 wherein the at least one junction device comprises a first number of diodes substantially equal to a second number of cells in the battery.

19. A low voltage cutoff circuit comprises:
a switching device having a control terminal, a current sourcing terminal and a current sinking terminal;
a resistor coupled between the control terminal and a first terminal of a battery;
a mechanical switch coupled in series with the battery and a first output terminal of the low voltage cutoff circuit and connected directly, without any intervening element, to the resistor that is coupled to the control terminal of the switching device with the low voltage cutoff circuit having in addition to the first output terminal, a second output terminal connected to the current sourcing terminal of the switching device, with the first and second output terminals of the low voltage cutoff circuit configured to accept connections to the terminals of a device load.

* * * * *

UNITED STATES PATENT AND TRADEMARK OFFICE
CERTIFICATE OF CORRECTION

PATENT NO. : 7,646,174 B2
APPLICATION NO. : 11/359270
DATED : January 12, 2010
INVENTOR(S) : Arbesman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 383 days.

Signed and Sealed this

Sixteenth Day of November, 2010

David J. Kappos
*Director of the United States Patent and Trademark Office*